US 8,294,611 B2
Oct. 23, 2012

(12) United States Patent
Trautenberg

(10) Patent No.: US 8,294,611 B2
(45) Date of Patent: Oct. 23, 2012

(54) METHOD FOR THE TRANSMISSION OF ADDITIONAL DATA ALONG WITH NAVIGATION MESSAGES IN A SATELLITE NAVIGATION SYSTEM

(75) Inventor: Hans L. Trautenberg, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 316 days.

(21) Appl. No.: 12/808,084

(22) PCT Filed: Dec. 15, 2008

(86) PCT No.: PCT/DE2008/002070
§ 371 (c)(1),
(2), (4) Date: Jun. 14, 2010

(87) PCT Pub. No.: WO2009/076937
PCT Pub. Date: Jun. 25, 2009

(65) Prior Publication Data
US 2010/0265136 A1 Oct. 21, 2010

(30) Foreign Application Priority Data

Dec. 14, 2007 (DE) .................. 10 2007 060 899
Dec. 11, 2008 (DE) .................. 10 2008 061 319

(51) Int. Cl.
*G01S 19/01* (2010.01)
(52) U.S. Cl. ................................. 342/357.39
(58) Field of Classification Search ............. 342/357.39
See application file for complete search history.

(56) References Cited

U.S. PATENT DOCUMENTS

| 6,944,534 B2 | 9/2005 | Trautenberg |
| 7,019,687 B1 | 3/2006 | Schempp et al. |
| 2009/0119002 A1 | 5/2009 | Krueger et al. |

FOREIGN PATENT DOCUMENTS

| WO | WO 03040749 A1 | 5/2003 |
| WO | WO 2007022869 A1 | 3/2007 |

OTHER PUBLICATIONS

International Search Report for PCT/DE2008/002070 mailed on Jul. 14, 2009.

*Primary Examiner* — Harry Liu
(74) *Attorney, Agent, or Firm* — Leydig, Voit & Mayer, Ltd.

(57) ABSTRACT

A method for transmitting additional information in a satellite navigation system includes providing a navigation message including a continuous data stream having a prescribed bit rate and structuring the navigation message in a plurality of pages generated according to a prescribed page definition so as to transmit information, wherein each of the plurality of pages includes a checksum calculated as a function of information contained in the page. The method further includes generating at least one new page containing the additional information so as to form a changed, navigation message according to a further page definition that differs from the prescribed page definition such that the checksum calculated as a function of information contained on the page generated according to the prescribed page definition is false; and transmitting the at least one new page.

8 Claims, 3 Drawing Sheets

METHOD FOR THE TRANSMISSION OF ADDITIONAL DATA ALONG WITH NAVIGATION MESSAGES IN A SATELLITE NAVIGATION SYSTEM

CROSS REFERENCE TO PRIOR APPLICATIONS

This application is a U.S. National Phase Application under 35 U.S.C. §371 of International Application No. PCT/DE2008/002070, filed Dec. 15, 2008, and claims benefit to German Application Nos. DE 10 2007 060 899.5, filed Dec. 14, 2007 and DE 10 2008 061 319.3, filed Dec. 11, 2008. The International Application was published in German on Jun. 25, 2009 as WO 2009/076937 under PCT Article 21 (2).

FIELD

The invention relates to a method for transmitting additional information with navigation messages in a satellite navigation system.

BACKGROUND

Satellite systems for worldwide navigation (Global Navigation Satellite System GNSS, satellite navigation system for short) are used for position determination and navigation on the ground and in the air. In order for a receiver to determine a given position, navigation messages are transmitted in the GNSS via the satellite signals. In the European GNSS Galileo (below also referred to as the Galileo system or Galileo for short), which is being set up at this time, however, the current specification only provides for very few bits for future expansions, which, of course, limits any later expansion of the Galileo system by new services and additional information.

SUMMARY OF THE INVENTION

Therefore, an aspect of the present invention is to provide a method for transmitting additional information with navigation messages in a satellite navigation system.

In a satellite navigation system like Galileo, a navigation message is organized or structured according to a prescribed page definition in various pages. Here, certain pages can be secured by means of a checksum associated with the definition of the page in question, a procedure which is provided, for example, in Galileo. An idea of the invention is to define additional new pages of the navigation messages in such a way that the checksum that is calculated as a function of information contained in the page generated according to the prescribed page definition is false. In this manner, it is possible to ensure that a receiver that operates only on the basis of the old page definition ignores the pages generated according to the new page definition. Through the new definition of pages, the invention allows the transmission of additional information in a navigation message.

According to an embodiment, the invention now relates to a method for transmitting additional information with navigation messages in a satellite navigation system, whereby a navigation message is a continuous data stream having a prescribed bit rate, said method comprising the following steps:
structuring a navigation message in several pages for the transmission of information according to a prescribed page definition, whereby each page has a checksum that is calculated as a function of information contained in the page generated according to the prescribed page definition,
generating new pages of the navigation message according to a page definition that differs from the prescribed page definition, so that the checksum that is calculated as a function of information contained in the page generated according to the prescribed page definition is false, and transmitting additional information by means of the newly generated pages.

The new page definition for a navigation message makes it possible to transmit additional information with the navigation message. A receiver that receives a navigation message with a new page structure can either evaluate said navigation message according to the new page definition, if it has been configured to do so, or else said receiver can at least partially ignore said navigation message if said receiver operates according to the old page definition, since the checksum is false for a page generated on the basis of the old page definition. Consequently, the generation of a new page definition is compatible with systems that operate on the basis of the prescribed or "old" page definition. Of course, the new page definition can likewise provide for checksums for the new pages.

According to an embodiment of the invention, the step of generating new pages of the navigation message according to the page definition that differs from the prescribed page definition can comprise the fact that the space in the data stream of a navigation message that is provided for the checksum that is calculated as a function of information contained in the page generated according to the prescribed page definition is only partially occupied with information in such a way that the calculated checksum is always false. If only part of the space that is provided for the checksum according to the old, i.e. the prescribed, page definition is occupied with information in order to render the calculated checksum "false", then the remaining space can be used for the new, i.e. the different page definition. As a result, additional space can be created for the transmission of additional information with the navigation message.

Moreover, according to an embodiment of the invention, a counter can be integrated into a new page of the navigation message for purposes of allowing a later expansion. This counter can consist of one or more bits.

Furthermore, according to an embodiment of the invention, the step of transmitting additional information by means of the newly generated pages can comprise the fact that information that is contained in the page generated according to the prescribed page definition is only partially replaced by the information that has to be additionally transmitted. In this manner, for example, it can be ensured that areas in the navigation message, or to put it more precisely, in the data stream, that are necessary according to the prescribed or "old" page definition for a continuous operation on the basis of the "old" page definition are retained and these areas allow the problem-free operation of receivers that operate on the basis of the old page definition. In this manner, it is also possible to retain information that is normally not secured by a checksum and that is thus, in principle, independent of a page definition.

In particular, according to an embodiment of the invention, the information "region status" and the "tail bits" of a navigation message, which are contained in the page generated according to the prescribed page definition, cannot be replaced by the information that has to be additionally transmitted. In other words, this information or these bits are also retained after a new definition of the page structure of a navigation message, so that all receivers can receive navigation messages or a data stream from satellites without any problem and can acquire at least this information from the received messages.

In an embodiment, the invention also relates to a satellite navigation system that comprises a space segment with several satellites that send satellite signals containing navigation messages that are to be received and evaluated by utilizing systems for position determination and navigation, and that comprises a ground segment with several observation and command stations that monitor the satellites, whereby one or more of the observation and command stations are configured to carry out a method according to the invention and, as described above, to transmit additional information to the utilizing systems. In such a satellite navigation system, a navigation message can be expanded by a new page definition even if this was not originally provided for.

Moreover, one embodiment of the invention provides a method for receiving additional information transmitted with a navigation message, said method having the following steps:

receiving a navigation message with a changed page structure that was generated and transmitted as described above by means of a method according to the invention, and ascertaining the additional information contained in the new pages of the received navigation message with the changed page structure.

Finally, in another embodiment, the invention provides a receiver for signals from a satellite navigation system, said signals containing navigation messages, whereby the receiver is configured to execute a method for receiving additional information transmitted by a method according to the invention as explained above. For example, the method can be implemented in the operating software of a receiver for navigation messages, for example, a navigation device. In this manner, the functionality of the receiver can be expanded in that the additional information is processed in the receiver, for example, in that new services of the satellite navigation system are integrated into the receiver through the additional information.

Additional advantages and application possibilities of the present invention ensue from the description below in conjunction with the embodiments shown in the drawings.

BRIEF DESCRIPTION OF THE DRAWINGS

In the description, in the claims, in the abstract and in the drawings, the terms and associated reference numerals cited below in the list of reference numerals are used.

The drawings show the following.

Below, the same and/or functionally equivalent elements are provided with the same reference numerals.

DETAILED DESCRIPTION

Figure 1:
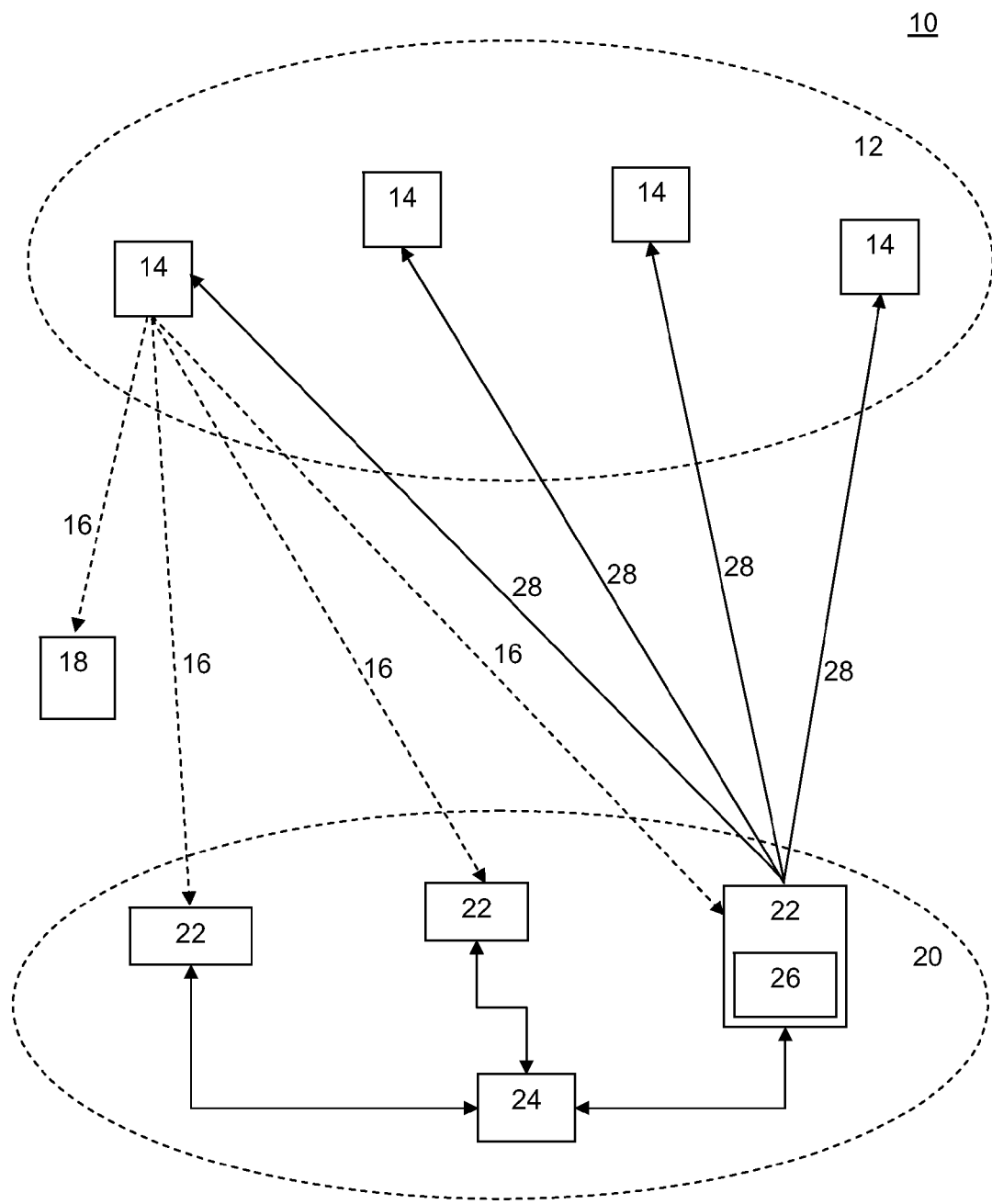
FIG. 1 a satellite navigation system with an embodiment of a device for transmitting additional information with navigation messages in a satellite navigation system according to the invention.

FIG. 1 shows a satellite navigation system 10 with a space segment 12 and a ground segment 20. The space segment 12 comprises several satellites 14 that each have their own orbit around the ground segment 20. Each satellite sends satellite signals 16 that can be received by utilizing systems 18 such as, for example, mobile navigation devices as well as by observation and command stations 22 of the ground segment 20. The satellite signals 16 contain navigation messages of the satellite navigation system 10 which contain orbital parameters for describing the orbit.

The observation and command stations 22, which are configured in Galileo as separate units, are especially provided for monitoring and controlling the satellites 14. For this purpose, they relay received navigation signals 16 via a communication network to a control center 24 that evaluates the received navigation signals 16 in that it checks the data from a satellite 14 that is transmitted with each navigation signal 16, especially the orbit and the point in time of the signal generation as well as the signal structure and the integrity of the received signals. The observation and command stations 22 also generate navigation messages 28 and send them continuously or in pulsating form to the satellites 14 for purposes of continuous further distribution to the utilizing systems 18.

The navigation messages 28 contain parameters containing orbital data, time data and other data that describes the navigation signal or the dissemination means and, in an observation and command station 22, they can also be provided with additional information that, embedded into the navigation messages, can be transmitted to the utilizing systems 18 via the satellite signals 16, for example, information pertaining to system expansions. For this purpose, an observation and command station 22 has appropriate processor means 26 for generating navigation messages 30. The processor means 26 are configured to execute the method that is sketched in the form of a flow chart in FIG. 2, for example, in that they execute appropriate algorithms.

Figure 2:
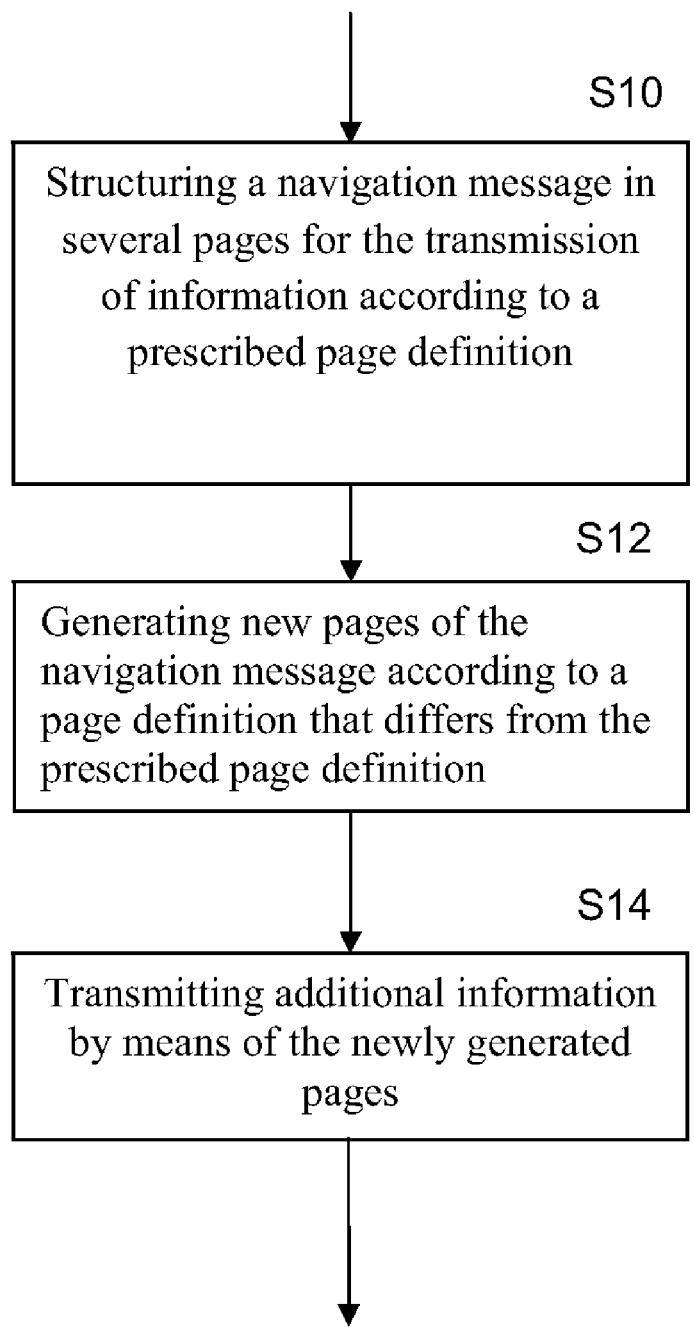
FIG. 2 a flow chart of an embodiment of a method for transmitting additional information with navigation messages in a satellite navigation system according to the invention.
Figure 3:
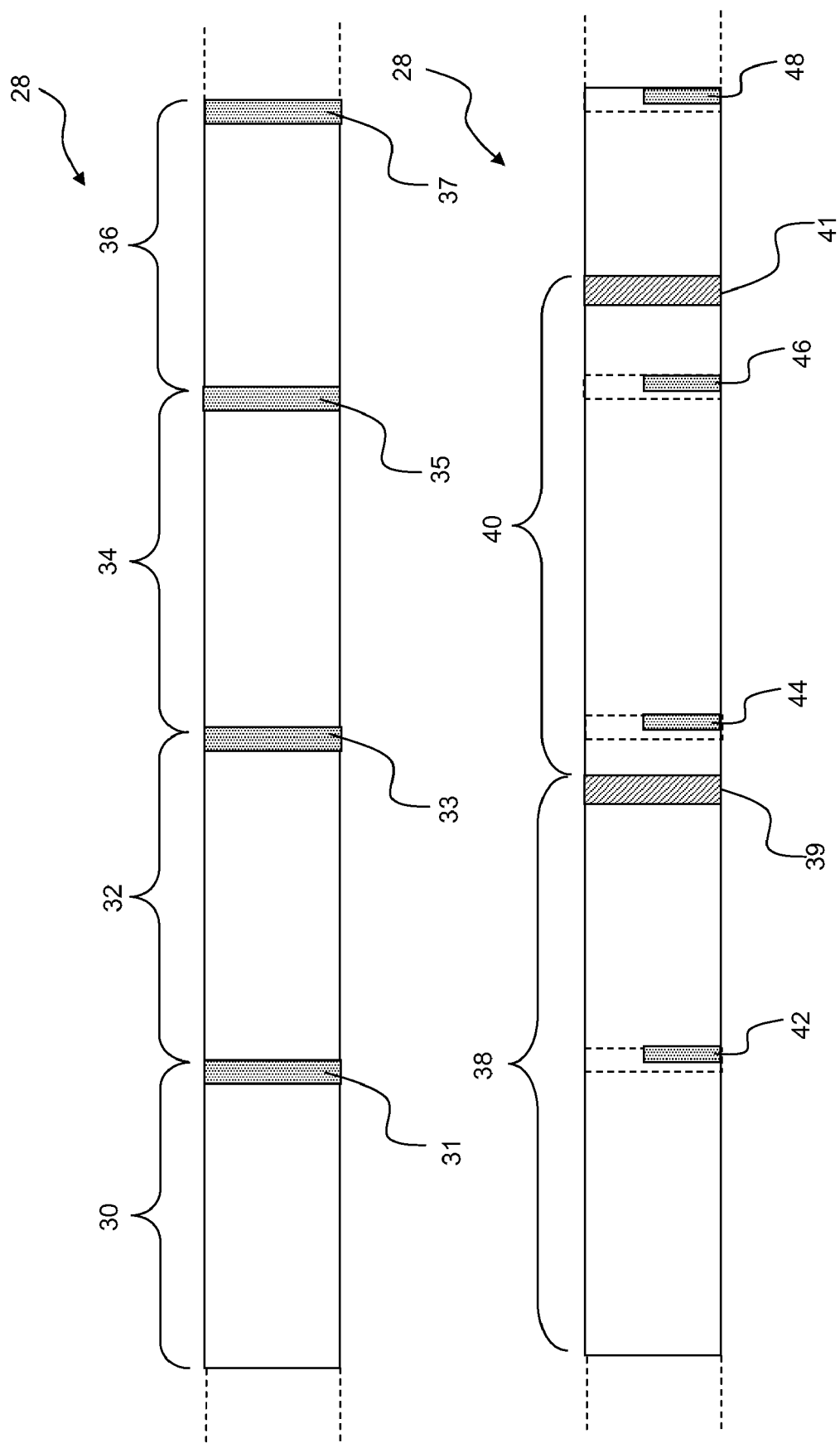
FIG. 3 an example of a navigation message with a prescribed page structure and with a different new page structure according to the invention.

According to the method sequence sketched in FIG. 2, in Step S10, a navigation message is structured in several pages for the transmission of information according to a prescribed page definition. At the top, FIG. 3 shows the navigation message that is generated according to the prescribed page definition. Here, the message 28 has several consecutive pages 30, 32, 34 and 36 in the data stream of the message. Each page 30, 32, 34 and 36 has its own checksum area 31, 33, 35 and 37, each of which accommodates a checksum that was calculated as a function of the information of a given page. In a next step S14 of the method, new pages of the navigation message 28 are then generated according to a page definition that differs from the prescribed page definition. The new page structure of the navigation message 28 is shown in the lower part of FIG. 3: now two consecutive pages 38 and 40 are each provided with a checksum area 39 and 41, i.e. the new page definition also provides a checksum for each page. Each of the two new pages has a utilization area that is larger than the pages generated on the basis of the "old" definition, so that additional information can be transmitted into the new pages 38 and 40 with the navigation message 28. The checksum areas of the pages 30, 32, 34 and 36 generated on the basis of the "old" page definition are drawn with dotted lines in the newly structured message 28. Parts 42, 44, 46 and 48 of these checksum areas are set in such a way that the checksum that is calculated as a function of information contained in the page generated according to the prescribed page definition is false. This ensures that a receiver that only "understands" the "old" page definition ignores the pages generated according to the new page definition that differs from the prescribed or "old" page definition. Finally, in a step S14, the additional information can be transmitted by means of the newly generated pages 38 and 40.

With the invention, a navigation message can be expanded by new page definitions, even if this was not provided for in the original specification for a navigation message. At the same time, receivers that only know the old page definitions can continue to operate properly because they ignore pages that are generated and transmitted on the basis of the new page definition in terms of the data content or contained information. Moreover, according to the invention, message parts that are not secured by a checksum can also be evaluated and processed in the newly defined pages by receivers that only "understand" the old page definitions.

REFERENCE NUMERALS 10 satellite navigation system
12 space segment
14 satellites
16 satellite signals
18 utilizing systems
20 ground segment
22 observation and command stations
24 control center
26 processor means for navigation messages 28
28 navigation message of an observation and command station 22
30, 32, 34, 36 pages according to a prescribed page definition
31, 33, 35, 37 checksum areas of pages 30, 32, 34 and 36
38, 40 pages according to a page definition that differs from the prescribed page definition
39, 41 checksum areas of pages 38 and 40
42, 44, 46, 48 parts of the checksum areas of pages 30, 32, 34 and 36
S10-S14 method steps

The invention claimed is:

1. A method for transmitting additional information in a satellite navigation system comprising:
providing a navigation message including a continuous data stream having a prescribed bit rate;
structuring the navigation message in a plurality of pages generated according to a prescribed page definition so as to transmit information, wherein each of the plurality of pages includes a checksum calculated as a function of information contained in the page;
generating at least one new page containing the additional information so as to form a changed navigation message according to a further page definition that differs from the prescribed page definition such that the checksum calculated as a function of information contained on the page generated according to the prescribed page definition is false; and
transmitting the at least one new page.

2. The method as recited in claim 1, wherein the generating includes providing a space in the data stream of the changed navigation message for the checksum that is only partially occupied with information such that the checksum calculated as a function of information contained on the page generated according to the prescribed page definition is always false.

3. The method as recited in claim 1, further comprising integrating a counter into the at least one new page so as to allow a further expansion.

4. The method as recited in claim 1, wherein the generating includes only partially replacing information contained in the page generated according to the prescribed page definition by the additional information.

5. The method as recited in claim 4, wherein only partially replacing includes not replacing the information contained in the page generated according to the prescribed page definition that includes region status information and tail bits information.

6. The method as recited in claim 1, further comprising:
receiving the changed navigation message; and
ascertaining the additional information contained in the changed navigation message.

7. A satellite navigation system comprising:
a space segment including a plurality of satellites each sending a satellite signal, the signal containing a navigation message;
a utilizing system configured to receive and evaluate the navigation messages for position determination and navigation; and
a ground segment including at least one observation and command station configured to monitor the plurality of satellites and to structure the navigation message in a plurality of pages generated according to a prescribed page definition so as to transmit information, wherein each of the plurality of pages includes a checksum calculated as a function of information contained in the page, to generate at least one new page of the navigation message containing additional information so as to form a changed navigation message according to a page definition that differs from the prescribed page definition such that the checksum calculated as a function of information contained in the page generated according to the prescribed page definition is false; and to transmit the at least one page.

8. The satellite navigation system as recited in claim 7, further comprising a receiver configured to receive the changed navigation message and to ascertain the additional information contained in the changed navigation message.

* * * * *